(12) United States Patent
Liu et al.

(10) Patent No.: US 11,006,473 B2
(45) Date of Patent: May 11, 2021

(54) RESOURCE SCHEDULING METHOD AND APPARATUS

(71) Applicant: HUAWEI TECHNOLOGIES CO., LTD., Guangdong (CN)

(72) Inventors: Zhe Liu, Shanghai (CN); Hao Tang, Shanghai (CN); Zhou Xu, Shanghai (CN); Jing Liu, Shanghai (CN); Guohua Zhou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/787,578

(22) Filed: Feb. 11, 2020

(65) Prior Publication Data

US 2020/0178333 A1 Jun. 4, 2020

Related U.S. Application Data

(63) Continuation of application No. PCT/CN2018/096317, filed on Jul. 19, 2018.

(30) Foreign Application Priority Data

Aug. 11, 2017 (CN) .......................... 201710686722.0

(51) Int. Cl.
*H04L 12/28* (2006.01)
*H04W 76/15* (2018.01)
(Continued)

(52) U.S. Cl.
CPC ........... *H04W 76/15* (2018.02); *H04W 24/10* (2013.01); *H04W 74/004* (2013.01); *H04W 74/006* (2013.01); *H04W 74/0833* (2013.01)

(58) Field of Classification Search
CPC ......... H04W 72/0453; H04W 74/0833; H04W 76/15; H04W 88/06
(Continued)

(56) References Cited

U.S. PATENT DOCUMENTS

2016/0057687 A1 2/2016 Horn et al.
2016/0219604 A1 7/2016 Fujishiro et al.
(Continued)

FOREIGN PATENT DOCUMENTS

CN 101938841 A 1/2011
CN 106535255 A 3/2017
(Continued)

OTHER PUBLICATIONS

Office Action issued in Chinese Application No. 201710686722.0 dated Mar. 25, 2020, 5 pages.
(Continued)

*Primary Examiner* — John Pezzlo
(74) *Attorney, Agent, or Firm* — Fish & Richardson P.C.

(57) ABSTRACT

A first access network device receives an addition request message from a second access network device. The first access network device determines a third uplink carrier used by a terminal to send a preamble to the first access network device, and sends an addition request acknowledgement message to the second access network device. The addition request acknowledgement message includes carrier indication information. The carrier indication information indicates the third uplink carrier. The third uplink carrier is at least one of the first uplink carrier or a second uplink carrier. The second uplink carrier and the first uplink carrier belong to a same cell of the first access network device and the second uplink carrier is a supplementary uplink carrier.

22 Claims, 7 Drawing Sheets

(51) Int. Cl.
  *H04W 24/10* (2009.01)
  *H04W 74/00* (2009.01)
  *H04W 74/08* (2009.01)
  *H04J 1/16* (2006.01)
(58) Field of Classification Search
  USPC ..................................... 370/252, 329, 278
  See application file for complete search history.

(56) References Cited

U.S. PATENT DOCUMENTS

| | | | |
|---|---|---|---|
| 2017/0303182 A1 | 10/2017 | Uchino et al. | |
| 2018/0220425 A1 | 8/2018 | Zhang et al. | |
| 2019/0261427 A1* | 8/2019 | Comstock | H04L 5/00 |
| 2020/0177330 A1* | 6/2020 | Kim | H04L 5/0005 |
| 2020/0229180 A1* | 7/2020 | Liu | H04W 72/0453 |
| 2020/0413455 A1* | 12/2020 | Comstock | H04W 74/08 |

FOREIGN PATENT DOCUMENTS

| | | |
|---|---|---|
| CN | 106559872 A | 4/2017 |
| EP | 2906006 A1 | 8/2015 |
| WO | 2015108382 A1 | 7/2015 |
| WO | 2016133123 A1 | 8/2016 |

OTHER PUBLICATIONS

ZTE, "Further Consideration on Xn Procedures for NR/LTE Tight-Interworking," 3GPP TSG RAN WG3 NR-adhoc, R3-170059; Spokane, USA, Jan. 17-19, 2017, 6 pages.

ZTE, "Further Consideration on Xn Procedures for NR / LTE Tight-Interworking", 3GPP TSG RAN WG3#95, R3-170532, Athens, Greece, Feb. 13-17, 2017, 4 pages.

3GPP TS 36.300 V14.3.0 (Jun. 2017), 3rd Generation Partnership Project; Technical Specification Group Radio Access Network, Evolved Universal Terrestrial Radio Access (E-UTRA) and Evolved Universal Terrestrial Radio Access Network (E-UTRAN), Overall description;Stage 2(Release 14), 331 pages.

3GPP TS 36.321 V14.3.0 (Jun. 2017), 3rd Generation Partnership Project; Technical Specification Group Radio Access Network, Evolved Universal Terrestrial Radio Access (E-UTRA), Medium Access Control (MAC) protocol specification (Release 14), 107 pages.

3GPP TS 36.423 V14.3.0 (Jun. 2017), 3rd Generation Partnership Project, Technical Specification Group Radio Access Network, Evolved Universal Terrestrial Radio Access Network(E-UTRAN), X2 application protocol (X2AP)(Release 14), 242 pages.

3GPP TS 38.331 V0.0.4 (Jun. 2017),3rd Generation Partnership Project, Technical Specification Group Radio Access Network, NR, Radio Resource Control (RRC), Protocol specification(Release 15 ), 22 pages.

3GPP TS 38.300 V0.6.0 (Aug. 2017), 3rd Generation Partnership Project,Technical Specification Group Radio Access Network, NR, NR and NG-RAN Overall Description, Stage 2(Release 15), Aug. 7, 2017, 58 pages.

3GPP TS 37.340 V0.2.1 (Aug. 2017), 3rd Generation Partnership Project, Technical Specification Group Radio Access Network, Evolved Universal Terrestrial Radio Access (E-UTRA) and NR, Multi-connectivity, Stage 2(Release 15), Aug. 9, 2017, 43 pages.

Nokia, "Bearer modelling and E2E QoS support for layer-2 relaying", 3GPP TSG-RAN WG2 Meeting #97bis, R2-1703363, Spokane, USA, Apr. 3-7, 2017. 5 pages.

Huawei, "Consideration on LTE-NR co-existence", 3GPP TSG-RAN WG3 #NR2 Ad-Hoc, R2-1707423, Qingdao, China, Jun. 27-29, 2017, 3 pages.

Huawei, HiSilicon:"Consideration on LTE-NR co-existence", 3GPP TSG-RAN WG2 Meeting #98, R2-1705161, Hangzhou, China, Apr. 15-19, 2017, 3 pages.

Huawei, HiSilicon:"Considerations of NR UL operation", 3GPP TSG RAN WG1 Meeting #88, R1-1701668, Athens, Greece, Feb. 13-17, 2017. 5 pages.

PCT International Search Report and Written Opinion in International Appliction No. PCT/CN2018/096,317, dated Oct. 11, 2018, 13 pages (With English Translation).

CMCC, "Discussion on SUL and UL sharing band definition," 3GPP TSG-RAN WG4 Meeting NR#2, R4-1706706, Qingdao, China, May 27-29, 2017, 6 pages.

Extended European Search Report issued in European Application No. 18843923.6 dated May 25, 2020, 9 pages.

Office Action issued in Chinese Application No. 201710686722.0 dated Dec. 14, 2020, 4 pages.

* cited by examiner

RESOURCE SCHEDULING METHOD AND APPARATUS

CROSS-REFERENCE TO RELATED APPLICATIONS

This application is a continuation of International Application No. PCT/CN2018/096317, filed on Jul. 19, 2018, which claims priority to Chinese Patent Application No. 201710686722.0, filed on Aug. 11, 2017. The disclosures of the aforementioned applications are hereby incorporated by reference in their entireties.

TECHNICAL FIELD

This application relates to the field of communications technologies, and in particular, to a resource scheduling method and apparatus.

BACKGROUND

In a future 5G communications system, that is, in standardization work for a new radio (NR) system, the NR system supports frequency band spreading from sub 6 GHz to 60 GHz. However, a long term evolution (LTE) system is mainly deployed on a sub 3 GHz frequency band. To make full use of an uplink resource on an LTE frequency division duplex (FDD) carrier, uplink transmission in the NR system may share an uplink resource on the LTE FDD carrier with uplink transmission in the LTE system. This not only makes full use of an uplink spectrum resource on the LTE FDD carrier, but also improves uplink coverage of the NR system. Currently, in an LTE-NR dual-connectivity (DC) scenario, the LTE system and the NR system share only the uplink resource on the LTE FDD carrier. The shared uplink resource on the LTE FDD carrier may be considered as a supplementary uplink (SUL) frequency resource in the NR system. For the supplementary uplink resource, an NR terminal may select an appropriate random access channel from the NR FDD/time division duplex (TDD) uplink resource and the supplementary uplink resource to access the NR system.

Currently, in the LTE-NR DC scenario, a master base station (e.g. Master eNB, MeNB), which is referred to as an MgNB or MeNB for short in the following) and a secondary base station (e.g. Secondary eNB, SeNB), which is referred to as an secondary base station for short in the following) may provide a data transmission service for a terminal. Before the terminal accesses the secondary base station, the secondary base station blindly configures a 1.8 GHz SUL or 3.5 GHz uplink (UL) frequency resource for the terminal based on load statuses of an uplink resource and a downlink resource. The terminal randomly accesses the secondary base station on the uplink resource blindly configured by the secondary base station.

However, because the secondary base station blindly configures the uplink resource for the terminal, a success rate for accessing the secondary base station by the terminal via the blindly configured uplink resource is quite low, reducing system efficiency.

SUMMARY

This application provides a resource scheduling method and apparatus, so as to resolve problem that because a base station blindly configures an uplink resource for a terminal, a success rate for accessing the base station by the terminal via the blindly configured uplink resource is quite low.

According to a first aspect, an embodiment of this application provides a resource scheduling method, where the method includes:

receiving, by a first access network device, an addition request message from a second access network device, where the addition request message includes a first signal measurement value, and the first signal measurement value is a signal measurement value of a downlink carrier corresponding to a first uplink carrier; and determining, by the first access network device based on the first signal measurement value, a third uplink carrier used by a terminal to send a preamble to the first access network device, and sending an addition request acknowledgement message to the second access network device.

The addition request acknowledgement message includes carrier indication information. The carrier indication information is used to indicate the third uplink carrier. The third uplink carrier is at least one of the first uplink carrier and a second uplink carrier. The second uplink carrier and the first uplink carrier belong to a same cell of the first access network device.

In the foregoing method, the first access network device determines, based on the first signal measurement value of the downlink carrier corresponding to the first uplink carrier, the third uplink carrier used by the terminal to send the preamble. Therefore, signal quality of the third uplink carrier used by the terminal to send the preamble can be ensured, and the first access network device more easily receives the preamble sent by the terminal, thereby improving access efficiency of the terminal to access the first access network device.

Optionally, the addition request acknowledgement message further includes one or more items of the following information:

configuration information of the first uplink carrier;
configuration information of the second uplink carrier; and
configuration information of a random access preamble.

The foregoing information may be used to indicate, to the terminal, carrier configuration and the configuration information of the random access preamble that are in the first access network, so that the terminal obtains information required for sending a preamble, and the terminal can send the preamble accurately and quickly, thereby improving access efficiency of the terminal.

Optionally, the second uplink carrier is a supplementary uplink resource for the first uplink carrier, and the configuration information of the second uplink carrier includes one or more items of the following information:

frequency information of the second uplink carrier;
bandwidth information of the second uplink carrier;
configuration information of a random access channel resource on the second uplink carrier; and
7.5 kHz offset information of an uplink resource subcarrier on the second uplink carrier.

The foregoing information may be used to indicate, to the terminal, specific configuration information of the second uplink carrier, so that when sending a preamble on the second uplink carrier, the terminal determines a random access channel resource more accurately.

Optionally, the configuration information of the random access preamble includes one or more items of the following information:

preamble indication information, used to indicate a dedicated preamble used by the terminal to initiate random access; and physical random access channel indication information, used to indicate a random access channel resource used by the terminal to send the preamble.

The foregoing information may be used to indicate, to the terminal, the preamble used to initiate the random access and the random access channel resource, so that the terminal can quickly initiate the random access, thereby improving access efficiency of the terminal.

Optionally, the first signal measurement value is a reference signal received power value of the downlink carrier corresponding to the first uplink carrier; or the first signal measurement value is a downlink path loss value of the downlink carrier corresponding to the first uplink carrier.

Optionally, after the sending, by the first access network device, an addition request acknowledgement message to the second access network device, the method further includes:

receiving, by the first access network device, the preamble sent by the terminal via the third uplink carrier.

Optionally, the addition request message further includes a second signal measurement value, and the second signal measurement value is a signal measurement value of a downlink carrier corresponding to the second uplink carrier; and the determining, by the first access network device based on the first signal measurement value and the second signal measurement value, a third uplink carrier used by the terminal to send a preamble to the first access network device includes:

determining, by the first access network device, signal quality of the first uplink carrier based on the first signal measurement value, and determining signal quality of the second uplink carrier based on the second signal measurement value; and if the first access network device determines that the signal quality of the first uplink carrier is better than the signal quality of the second uplink carrier, determining the first uplink carrier as the third uplink carrier used by the terminal to send a preamble to the first access network device; or if the first access network device determines that the signal quality of the second uplink carrier is better than the signal quality of the first uplink carrier, determining the second uplink carrier as the third uplink carrier used by the terminal to send a preamble to the first access network device.

In the foregoing method, the first access network device determines an optimal uplink carrier based on the first signal measurement value and the second signal measurement value, so as to instruct the terminal to send the preamble on the optimal uplink carrier, and the first access network device can more accurately obtain the preamble sent by the terminal, thereby improving access efficiency of the terminal.

According to a second aspect, an embodiment of this application provides a resource scheduling apparatus, where the resource scheduling apparatus includes a memory, a transceiver, and a processor. The memory is configured to store an instruction. The processor is configured to execute the instruction stored in the memory, and control the transceiver to receive and send signals. When the processor executes the instruction stored in the memory, the resource scheduling apparatus is configured to perform the method in the first aspect or any possible design of the first aspect.

According to a third aspect, an embodiment of this application provides a resource scheduling apparatus, configured to implement the first aspect or any method in the first aspect, including corresponding functional modules, for example, a processing unit, a receiving unit, and a sending unit, which are respectively used to implement the steps in the foregoing method.

According to a fourth aspect, an embodiment of this application provides a resource scheduling method, including:

sending, by a second access network device, an addition request message to a first access network device, where the addition request message includes a first signal measurement value, and the first signal measurement value is a signal measurement value of a downlink carrier corresponding to a first uplink carrier;

receiving, by the second access network device, an addition request acknowledgement message from the first access network device, where the addition request acknowledgement message includes carrier indication information, the carrier indication information is used to indicate a third uplink carrier used by a terminal to send a preamble to the first access network device, the third uplink carrier is at least one of the first uplink carrier and a second uplink carrier, the second uplink carrier and the first uplink carrier belong to a same cell of the first access network device, and the third uplink carrier is determined by the first access network device based on the first signal measurement value; and sending, by the second access network device, the carrier indication information to the terminal.

In the foregoing method, the second access network device sends, to the first access network device, a first signal measurement value of the downlink carrier corresponding to the first uplink carrier, so that the first access network device may determine, based on the first signal measurement value, the third uplink carrier used by the terminal to send the preamble. Therefore, signal quality of the third uplink carrier used by the terminal to send the preamble can be ensured, and the first access network device can more easily receive the preamble sent by the terminal, thereby improving access efficiency of the terminal to access the first access network device.

Optionally, the addition request acknowledgement message further includes one or more items of the following information:

configuration information of the first uplink carrier;
configuration information of the second uplink carrier; and
configuration information of a random access preamble.

Optionally, the second uplink carrier is a supplementary uplink resource for the first uplink carrier, and the configuration information of the second uplink carrier includes one or more items of the following information:

frequency information of the second uplink carrier;
bandwidth information of the second uplink carrier;
configuration information of a random access channel resource on the second uplink carrier; and
7.5 kHz offset information of an uplink resource subcarrier on the second uplink carrier.

Optionally, the configuration information of the random access preamble includes one or more items of the following information:

preamble indication information, used to indicate a dedicated preamble used by the terminal to initiate random access; and physical random access channel indication information, used to indicate a random access channel resource used by the terminal to send the preamble.

Optionally, the first signal measurement value is a reference signal received power value of the downlink carrier corresponding to the first uplink carrier; or the first signal measurement value is a downlink path loss value of the downlink carrier corresponding to the first uplink carrier.

Optionally, the addition request message further includes a second signal measurement value, and the second signal measurement value is a signal measurement value of a downlink carrier corresponding to the second uplink carrier; and before the sending, by a second access network device, an addition request message to a first access network device, the method further includes:

receiving, by the second access network device, the first signal measurement value and the second signal measurement value that are reported by the terminal.

According to a fifth aspect, an embodiment of this application provides a resource scheduling apparatus, where the resource scheduling apparatus includes a memory, a transceiver, and a processor. The memory is configured to store an instruction. The processor is configured to execute the instruction stored in the memory, and control the transceiver to receive and send signals. When the processor executes the instruction stored in the memory, the resource scheduling apparatus is configured to perform the method in the fourth aspect or any possible design of the fourth aspect.

According to a sixth aspect, an embodiment of this application provides a resource scheduling apparatus, configured to implement the fourth aspect or any method in the fourth aspect, including corresponding functional modules, for example, a processing unit, a receiving unit, and a sending unit, which are respectively used to implement the steps in the foregoing method.

According to a seventh aspect, an embodiment of this application provides a resource scheduling method, including:

receiving, by a terminal, carrier indication information sent by a second access network device, where the second access network device is a device that establishes a radio resource control connection to the terminal, the carrier indication information is used to indicate a third uplink carrier used by the terminal to send a preamble to a first access network device, the third uplink carrier is at least one of the first uplink carrier and a second uplink carrier, the second uplink carrier and the first uplink carrier belong to a same cell of the first access network device, and the third uplink carrier is determined by the first access network device based on the first signal measurement value; and sending, by the terminal, a preamble to the first access network device via the third uplink carrier.

In the foregoing method, the third uplink carrier used by the terminal to send the preamble is determined by the first access network device based on a first signal measurement value of a downlink carrier corresponding to the first uplink carrier. Therefore, signal quality of the third uplink carrier can be ensured, and the preamble sent by the terminal is more easily received by the first access network device, thereby improving access efficiency of the terminal to access the first access network device.

Optionally, before the receiving, by a terminal, carrier indication information sent by a second access network device, the method further includes:

sending, by the terminal, the first signal measurement value and a second signal measurement value to the second access network device, where the second signal measurement value is a signal measurement value of a downlink carrier corresponding to the second uplink carrier.

According to an eighth aspect, an embodiment of this application provides a resource scheduling apparatus, where the resource scheduling apparatus includes a memory, a transceiver, and a processor. The memory is configured to store an instruction. The processor is configured to execute the instruction stored in the memory, and control the transceiver to receive and send signals. When the processor executes the instruction stored in the memory, the resource scheduling apparatus is configured to perform the method in the seventh aspect or any possible design of the seventh aspect.

According to a ninth aspect, an embodiment of this application provides a resource scheduling apparatus, configured to implement the seventh aspect or any method in the seventh aspect, including corresponding functional modules, for example, a processing unit, a receiving unit, and a sending unit, which are respectively used to implement the steps in the foregoing method.

According to a tenth aspect, an embodiment of this application provides a computer-readable storage medium. The computer storage medium stores a computer-readable instruction, and when a computer reads and executes the computer-readable instruction, the computer performs the method in any one of the foregoing aspects or the possible designs of the foregoing aspects.

According to an eleventh aspect, an embodiment of this application provides a computer program product. When a computer reads and executes the computer program product, the computer performs the method in any one of the foregoing aspects or the possible designs of the foregoing aspects.

According to a twelfth aspect, an embodiment of this application provides a chip. The chip is connected to a memory, and is configured to read and execute a software program stored in the memory, so as to implement the method in any one of the foregoing aspects or the possible designs of the foregoing aspects.

DESCRIPTION OF EMBODIMENTS

The following further describes in detail this application with reference to accompanying drawings.

The embodiments of this application may be applied to various mobile communications systems, such as a global system for mobile communications (GSM), a code division multiple access (CDMA) system, a wideband code division multiple access (WCDMA) system, a general packet radio service (GPRS), a long term evolution (LTE) system, a long term evolution advanced (LTE-A) system, a universal mobile telecommunications system (UMTS), an evolved long term evolution (eLTE) system, a 5G system (for example, an NR system), and other mobile communications systems.

In the following, some terms in this application are described, so as to help a person skilled in the art have a better understanding.

(1) A terminal, also referred to as user equipment (UE), is a device that provides a user with voice and/or data connectivity, for example, a handheld device or an in-vehicle device having a wireless connection function. Commonly seen terminals include, for example, a mobile phone, a tablet computer, a notebook computer, a palmtop computer, a mobile internet device (MID), and a wearable device, such as a smartwatch, a smart band, or a pedometer.

(2) An access network device may be a common base station (such as a NodeB or an eNB), a new radio controller (NR controller), a gNB in an NR system, a centralized unit, a new radio gNB, a remote radio module, a micro base station, a relay, a distributed unit, a transmission reception point (TRP), a transmission point (TP), or any other wireless access device. However, the embodiments of this application are not limited thereto.

Figure 1:
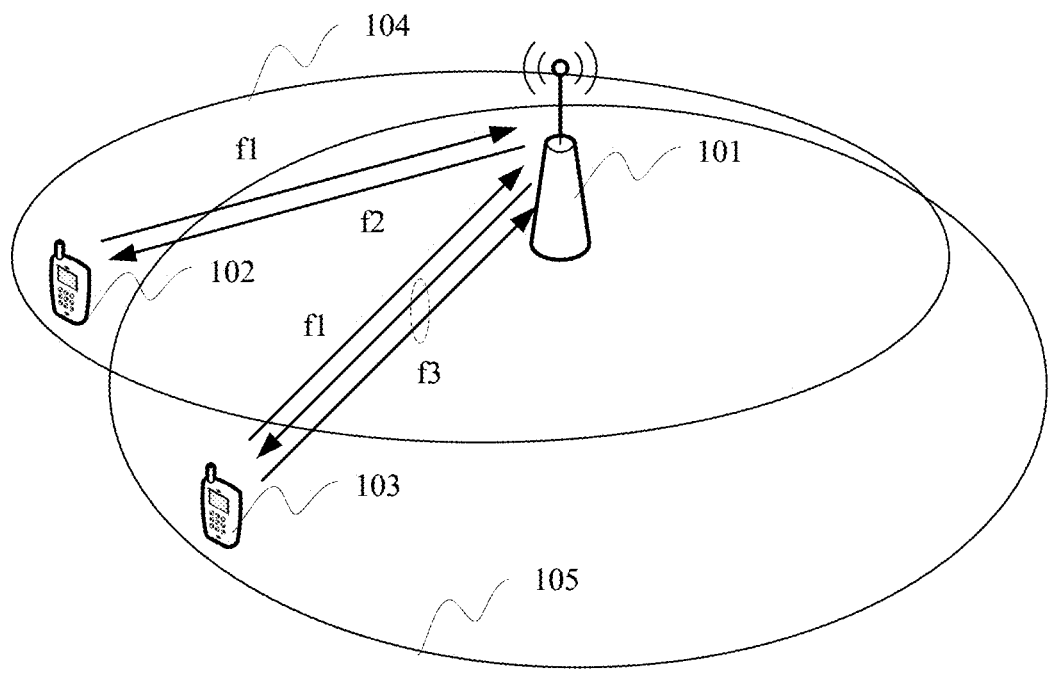
FIG. 1 is a schematic diagram of a dual-connectivity scenario applicable to an embodiment of this application.

An embodiment of this application is applicable to a dual-connectivity scenario of an LTE system and an NR system, or a dual-connectivity scenario of an NR system and an NR system. FIG. 1 is a schematic diagram of a dual-connectivity scenario applicable to an embodiment of this application. In FIG. 1, an access network device 101 may work in both the LTE system and the NR system, in other words, the access network device 101 may establish both a connection for an LTE cell 104 and a connection for an NR cell 105. A terminal 102 in the LTE cell 104 is a terminal that supports the LTE system, and a terminal 103 in the NR cell 105 is a terminal that supports the NR system. The terminal 102 performs uplink communication with the access network device 101 via a low-frequency spectrum f1, and performs downlink communication with the access network device 101 via a low-frequency spectrum f2. The terminal 103 performs uplink communication with the access network device 101 via the low-frequency spectrum f1, and performs downlink communication with the access network device 101 via a high-frequency spectrum D.

Figure 2:
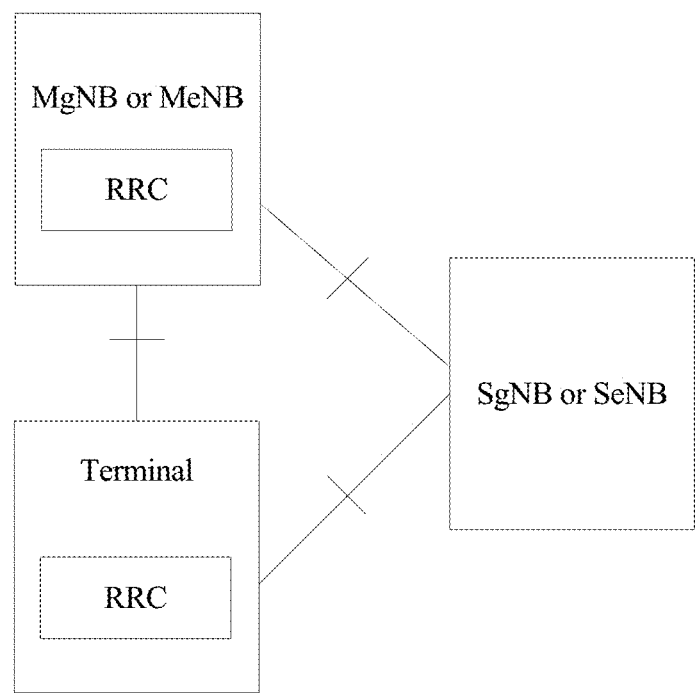
FIG. 2 is a schematic diagram of a control plane structure in a first dual-connectivity scenario.

In the dual-connectivity scenario, each terminal has only one radio resource control (RRC) status, that is an RRC connected state or an RRC idle state. According to the foregoing principle, the 3rd Generation Partnership Project (3GPP) proposes control plane structures for the two dual-connectivity scenarios. FIG. 2 is a schematic diagram of a control plane structure in a first dual-connectivity scenario. The structure shown in FIG. 2 may be referred to as a C1 structure.

In the control plane structure in the first dual-connectivity scenario, after performing radio resource management (RRM) coordination, a master base station and an secondary base station are jointly responsible for sending final RRC signaling to a terminal. After identifying RRC signaling from the master base station, an RRC entity of the terminal feeds back response information only to an RRC entity of the master base station.

Figure 3:
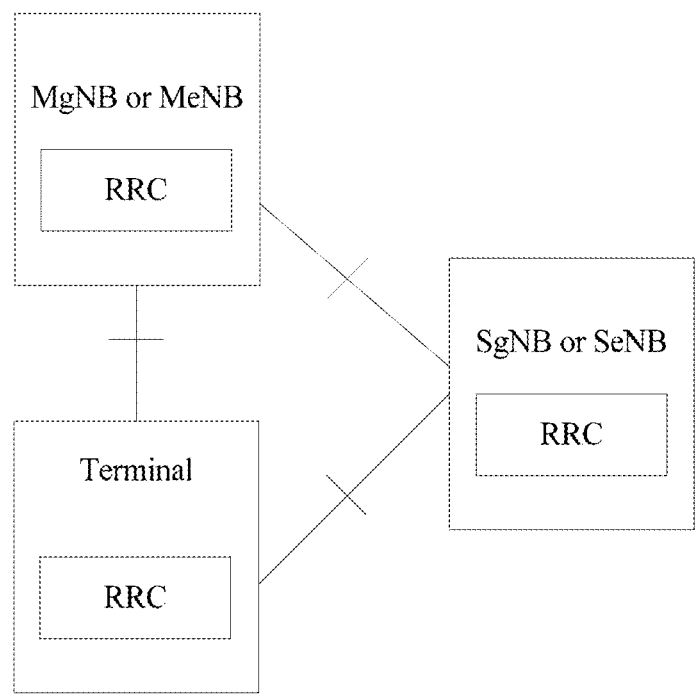
FIG. 3 is a schematic diagram of a control plane structure in a second dual-connectivity scenario.

FIG. 3 is a schematic diagram of a control plane structure in a second dual-connectivity scenario. The structure shown in FIG. 3 may be referred to as a C2 structure.

In the control plane structure in the second dual-connectivity scenario, after performing RRM coordination, a master base station and an secondary base station are jointly responsible for sending final RRC signaling to a terminal. After identifying RRC signaling from the master base station and the secondary base station, an RRC entity of the terminal separately sends response information to RRC entities of the master base station and the secondary base station.

For example, in the LTE-NR DC scenario, an LTE eNB may be used as the MeNB, and an NR gNB may be used as the SgNB. A working frequency of a cell of the master base station may be a 20 MHz carrier on a band 1, for example, a downlink frequency is 2120 MHz, and an uplink frequency is 1930 MHz. One NR cell that is to be added as a primary secondary cell (PSCell) exists in the secondary base station. The primary secondary cell includes one 3.5 GHz TDD carrier and one 1.8 GHz supplementary uplink resource (used to improve uplink coverage of the 3.5 GHz TDD carrier). The master base station master base station interacts with the secondary base station via an X2 or Xn interface. In this scenario, the terminal may be a dual-mode terminal that supports an LTE frequency band and an NR frequency band, and the terminal may perform a service transmission with the master base station and the secondary base station, thereby improving transmission efficiency of the terminal.

In this embodiment of this application, a downlink carrier may be understood as a carrier used for downlink transmission in carriers (including a carrier in a non-carrier aggregation (CA) scenario and a component carrier (CC) in a CA scenario) or a serving cell used for downlink transmission in serving cells (including a serving cell in a CA scenario and a serving cell in a non-CA scenario). An uplink carrier may be understood as a carrier used for uplink transmission in carriers (including a carrier in a non-CA scenario and a CC in a CA scenario) or a serving cell used for uplink transmission in serving cells (including a serving cell in a CA scenario and a serving cell in a non-CA scenario). A CC in the CA scenario may be a primary CC or a secondary CC, and a serving cell in the CA scenario may be a primary cell or a secondary cell. The uplink carrier may also be referred to as an uplink resource, and the downlink carrier may also be referred to as a downlink resource. Correspondingly, the carrier or the serving cell that is used for the downlink transmission in the carriers or the serving cells may be understood as the downlink resource or the downlink carrier. For example, in a frequency division duplex (FDD) system, a frequency resource used for uplink transmission on a carrier may be understood as the uplink resource or an uplink carrier. A frequency resource used for downlink transmission may be understood as a downlink resource or a downlink carrier. For another example, in a time division duplex (TDD) system, a time domain resource used for uplink transmission on a carrier may be understood as the uplink resource or an uplink carrier. A time domain resource used for downlink transmission may be understood as a downlink resource or a downlink carrier.

Figure 4:
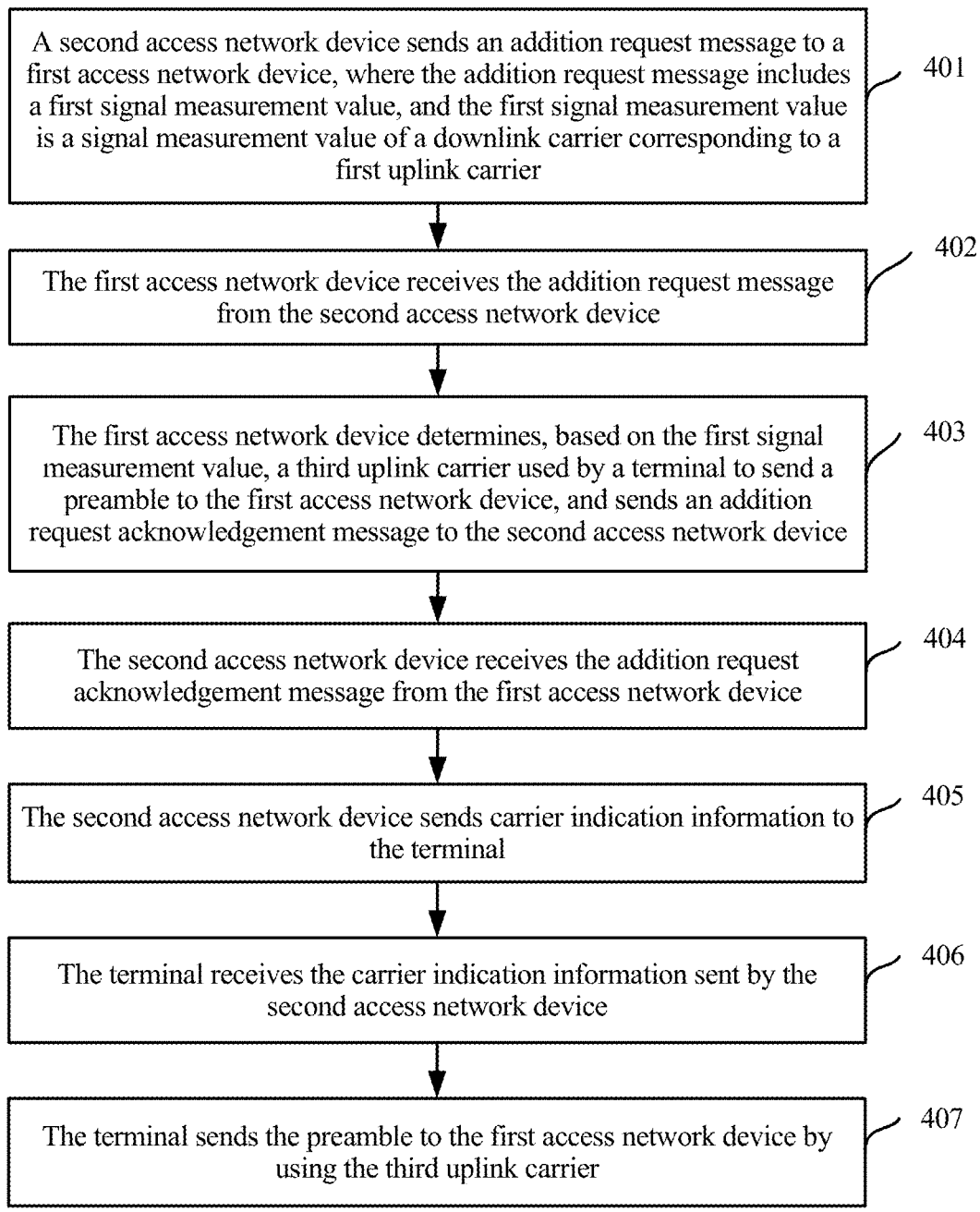
FIG. 4 is a schematic flowchart of a resource scheduling method according to an embodiment of this application.

With reference to the foregoing description, FIG. 4 is a schematic flowchart of a communication method according to an embodiment of this application. In the method, a first access network device and a second access network device serve a terminal in a dual-connectivity manner. The first access network device may be a secondary access network device, and the second access network device is a primary access network device. For example, in an LTE-NR DC scenario, the first access network device may be an NR gNB, and the second access network device may be an LTE eNB. Certainly, the foregoing description is merely an example. Types of the first access network device and the second access network device may be determined based on an actual situation. The first access network device may also be a primary access network device, and the second access network device may also be a secondary access network device. Examples are not given one by one herein.

Referring to FIG. 4, the method includes the following steps.

Step 401: A second access network device sends an addition request message to a first access network device, where the addition request message includes a first signal measurement value, and the first signal measurement value is a signal measurement value of a downlink carrier corresponding to a first uplink carrier.

The addition request message further includes one or more items of the following information:

a physical cell identifier of a cell, that is a physical cell identifier of the downlink carrier corresponding to the first uplink carrier;

frequency information of a carrier included in a cell, that is, a frequency of the downlink carrier corresponding to the first uplink carrier; and bandwidth information of a carrier included in a cell, that is, bandwidth of the downlink carrier corresponding to the first uplink carrier.

It should be noted that, in this embodiment of this application, if a correspondence exists between an uplink carrier and a downlink carrier, it indicates, in an FDD transmission mode, that the uplink carrier and the downlink carrier belong to one band, where one band defines one frequency domain range in which the downlink carrier is located and one frequency domain range in which the uplink carrier is located; and it indicates, in a TDD transmission mode, that the uplink carrier and the downlink carrier have a same frequency. For example, a frequency of the first uplink carrier is 3.5 GHz, and a frequency of the downlink carrier corresponding to the first uplink carrier is 3.5 GHz, or the downlink carrier corresponding to the first uplink carrier and a first uplink carrier belong to one band.

Certainly, the foregoing description is merely an example. The correspondence between the uplink carrier and the downlink carrier may further exist in another form. Details are not described herein again.

Step 402: The first access network device receives the addition request message from the second access network device.

Step 403: The first access network device determines, based on the first signal measurement value, a third uplink carrier used by a terminal to send a preamble to the first access network device, and sends an addition request acknowledgement message to the second access network device.

The addition request acknowledgement message includes carrier indication information. The carrier indication information is used to indicate the third uplink carrier. The third uplink carrier is at least one of the first uplink carrier and a second uplink carrier. The second uplink carrier and the first uplink carrier belong to a same cell of the first access network device.

In this embodiment of this application, the second uplink carrier may be a supplementary uplink (SUL) resource, such as an SUL carrier or a frequency. The SUL resource means that only an uplink resource is used for transmission of a current communications standard. For example, for a carrier, only an uplink resource is used for transmission. For example, in a 5th generation (5G) mobile communications system, which is also referred to as a new radio communications system, when a carrier A is used only for uplink transmission in NR, and the carrier A is not used for downlink transmission, or is used for downlink transmission in an LTE communications system but is not used for downlink transmission in the NR, the carrier A is an SUL resource.

Step 404: The second access network device receives the addition request acknowledgement message from the first access network device.

The addition request acknowledgement message includes the carrier indication information. The carrier indication information is used to indicate the third uplink carrier used by the terminal to send the preamble to the first access network device. The third uplink carrier is determined by the first access network device based on the first signal measurement value.

Step 405: The second access network device sends the carrier indication information to the terminal.

In the foregoing method, the first access network device determines, based on a first signal measurement value of the downlink carrier corresponding to the first uplink carrier, the third uplink carrier used by the terminal to send the preamble. Therefore, signal quality of the third uplink carrier used by the terminal to send the preamble can be ensured, and the first access network device more easily receives the preamble sent by the terminal, thereby improving access efficiency of the terminal to access the first access network device.

The second access network device may send the carrier indication information to the terminal via RRC connection reconfiguration signaling. The RRC connection reconfiguration signaling may further include other configuration information sent by the first access network device to the terminal, such as configuration information of the first uplink carrier, configuration information of the second uplink carrier, and configuration information of a random access preamble. After the first access network device sends the foregoing information to the second access network device, the second access network device may parse information such as the carrier indication information, the configuration information of the first uplink carrier, the configuration information of the second uplink carrier, and the configuration information of the random access preamble that are included in the addition request acknowledgement message, or may not parse the foregoing information and directly transparently transmit the foregoing information to the terminal via the RRC connection reconfiguration signaling.

Step 406: The terminal receives the carrier indication information sent by the second access network device.

Step 407: The terminal sends the preamble to the first access network device via the third uplink carrier.

Before step 401, the terminal establishes an RRC connection to the second access network device, and the terminal exchanges, with the second access network device, reference signal received power (RSRP) or a downlink path loss value of each carrier included in the first access network device.

For example, in a dual-connectivity scenario, the first access network device may be an NR gNB, and the second access network device may be an LTE eNB. The second access network device may send, to the terminal via the RRC reconfiguration signaling, related information about a to-be-measured object (which may be a carrier, a cell, a reference signal, or the like) on the first access network device. The related information includes but is not limited to information such as an absolute radio frequency channel number (ARFCN), allowed measurement bandwidth, and antenna port configuration (e.g. presenceAntennaPort). The terminal reports a measurement result of the foregoing to-be-measured object to the second access network device via an uplink dedicated control channel at a media access control (MAC) layer.

A specific interaction process may include the following steps.

Step 1: A second access network device notifies, via RRC reconfiguration signaling, a terminal of information such as frequency information, bandwidth information, and a cell identifier that are of a to-be-measured cell.

The to-be-measured cell may include the first uplink carrier, the downlink carrier corresponding to the first uplink carrier, and the second uplink carrier. For example, the first uplink carrier is an NR 3.5 GHz UL carrier, the downlink carrier corresponding to the first uplink carrier is an NR 3.5 GHz downlink (DL) carrier, and the second uplink carrier is an NR 1.8 GHz SUL carrier.

Optionally, the second access network device notifies, via the RRC reconfiguration signaling, the terminal of transmit power of a reference signal carried on each carrier in the to-be-measured cell. The reference signal may be a signal such as a synchronization signal block (SS block), a channel state information-reference signal (CSI-RS), or a cell reference signal (CRS).

Optionally, when a to-be-measured carrier is a 1.8 GHz SUL carrier, the second access network device notifies, via the RRC reconfiguration signaling, the terminal of information such as cell identifier information, frequency information, and transmit power of a reference signal that are of an LTE 1.8 GHz downlink (DL) carrier corresponding to the 1.8 GHz SUL carrier.

Step 2: The terminal measures a to-be-measured carrier based on the RRC reconfiguration signaling sent by the second access network device (a measConfig information element in the RRC reconfiguration signaling notifies the terminal of information about the carrier that will be measured), to obtain a measurement result, and reports the measurement result to the second access network device via an RRC message (such as a measurement Report message).

The result reported by the terminal includes at least a signal measurement value of each carrier in each cell.

The signal measurement value may be a reference signal received power value of a downlink carrier corresponding to an uplink carrier in the cell. Alternatively, the signal measurement value may be a downlink path loss value of a downlink carrier corresponding to an uplink carrier in the cell.

For example, carriers included in the cell are respectively as follows: The first uplink carrier is an NR 3.5 GHz UL carrier, the downlink carrier corresponding to the first uplink carrier is an NR 3.5 GHz DL carrier, and the second uplink carrier is an NR 1.8 GHz SUL carrier. In this case, the measurement result of the terminal includes a first signal measurement value: a signal measurement value of the NR 3.5 GHz DL carrier; a second signal measurement value: a signal measurement value of a downlink carrier corresponding to the NR 1.8 GHz SUL carrier; and the like.

It should be noted that specific methods for calculating a reference signal received power value and a downlink path loss value are not limited in this embodiment of this application. Details are not described herein again.

In step 401, the addition request message further includes a second signal measurement value, and the second signal measurement value is a signal measurement value of a downlink carrier corresponding to the second uplink carrier. The second uplink carrier may be a supplementary uplink resource for the first uplink carrier.

The first signal measurement value and the second signal measurement value are received by the second access network device from the terminal.

Optionally, the addition request message further includes one or more items of the following information:

a physical cell identifier of a cell, that is, a cell identifier of a cell to which the second uplink carrier and the first uplink carrier belong;

frequency information of a carrier included in a cell, that is, a frequency of a downlink carrier included in a cell to which the second uplink carrier and the first uplink carrier belong; and bandwidth information of a carrier included in a cell, that is, bandwidth of a downlink carrier included in a cell to which the second uplink carrier and the first uplink carrier belong.

Certainly, the foregoing description is merely an example. Content included in the addition request message may be determined based on an actual situation. Examples are not given one by one herein.

In step 402, the first access network device may obtain information such as the first signal measurement value and the second signal measurement value via the addition request message. Details are not described herein again.

In step 403, the first access network device may determine, via a plurality of methods, the third uplink carrier used by the terminal to send the preamble to the first access network device. Details are described below.

In a possible implementation, the first access network device determines a signal measurement value of the first uplink carrier based on the first signal measurement value. The determined signal measurement value of the first uplink carrier is equal to the first signal measurement value.

If the first access network device determines that the first signal measurement value is greater than a first preset threshold, and load of the first uplink carrier is greater than a second preset threshold, the first access network device determines the second uplink carrier as the third uplink carrier.

If the first access network device determines that the first signal measurement value is less than or equal to a first preset threshold, and load of the first uplink carrier is less than or equal to a second preset threshold, the first access network device determines the first uplink carrier as the third uplink carrier.

It should be noted that a correspondence exists between the first uplink carrier and the downlink carrier corresponding to the first uplink carrier. According to channel reciprocity, the signal measurement value of the downlink carrier corresponding to the first uplink carrier may be equal to the signal measurement value of the first uplink carrier. Therefore, a first access network device may determine the signal measurement value of the first uplink carrier based on the first signal measurement value. Correspondingly, the first network device may determine a signal measurement value of the second uplink carrier based on the signal measurement value of the downlink carrier corresponding to the second uplink carrier.

In a possible implementation, the first access network device determines a signal measurement value of the first uplink carrier based on the first signal measurement value, and determines a signal measurement value of the second uplink carrier based on the second signal measurement value. The determined signal measurement value of the first uplink carrier is equal to the first signal measurement value, and the determined signal measurement value of the second uplink carrier is equal to the second signal measurement value.

If the first access network device determines that the first signal measurement value is less than or equal to a first preset threshold, and load of the first uplink carrier is less than or equal to a second preset threshold, and if the first access network device determines that the second signal measurement value is less than or equal to the first preset threshold, and load of the second uplink carrier is less than or equal to the second preset threshold, the first access network device determines the first uplink carrier and the second uplink carrier as the third uplink carrier. In this case, the terminal may send the preamble via either of the first uplink carrier and the second uplink carrier, or send the preamble on both the first uplink carrier and the second uplink carrier.

In a possible implementation, the first access network device determines a signal measurement value of the first uplink carrier based on the first signal measurement value, and determines a signal measurement value of the second uplink carrier based on the second signal measurement value. The determined signal measurement value of the first uplink carrier is equal to the first signal measurement value, and the determined signal measurement value of the second uplink carrier is equal to the second signal measurement value.

If the first access network device determines, based on the signal measurement value of the first uplink carrier and the signal measurement value of the second uplink carrier, that signal quality of the first uplink carrier is better than signal quality of the second uplink carrier, the first access network device determines the first uplink carrier as the third uplink carrier used by the terminal to send the preamble to the first access network device. Alternatively, if the first access network device determines, based on the signal measurement value of the first uplink carrier and the signal measurement value of the second uplink carrier, that signal quality of the second uplink carrier is better than signal quality of the first uplink carrier, the first access network device determines the second uplink carrier as the third uplink carrier used by the terminal to send the preamble to the first access network device.

Certainly, the foregoing description is merely an example. The first access network device may determine, via another method, the third uplink carrier used by the terminal to send the preamble to the first access network device. Details are not described herein again.

In step 403, the carrier indication information determined by the first access network device may indicate the third uplink carrier via at least one bit. For example, when the addition request acknowledgement message includes the configuration information of the first uplink carrier and the configuration information of the second uplink carrier, a sequence for configuring the foregoing information may be represented by 0 and 1. For example, if the addition request acknowledgement message first includes the configuration information of the second uplink carrier and then includes the configuration information of the first uplink carrier, when a value of a bit included in the carrier indication information is 0, it indicates that the third uplink carrier is the first uplink carrier, and when a value of a bit included in the carrier indication information is 1, it indicates that the third uplink carrier is the second uplink carrier. Certainly, the foregoing description is merely an example. A specific form of the carrier indication information is not limited.

Optionally, the carrier indication information may be indicated via an uplink carrier activation field. There may be a 2-bit uplink carrier activation field in the addition request acknowledgement message. The first bit indicates activation information of one uplink carrier, where 0 represents inactivation, and 1 represents activation. The first bit may represent an activation status of one uplink carrier in a sequence or according to another rule, and this is not specifically limited. For example, the first bit represents the first uplink carrier, namely, a 1.8 G supplementary uplink carrier, and the second bit represents the second uplink carrier, namely, a 3.5 G dedicated uplink carrier. In this case, when the carrier indication information is 10, it indicates that the terminal sends a dedicated preamble on the 1.8 G supplementary uplink carrier, when the carrier indication information is 01, it indicates that the terminal sends a dedicated preamble on the 3.5 GHz dedicated uplink carrier, or when the carrier indication information is 11, it indicates that the terminal activates two uplink carriers, and the terminal may send a dedicated preamble on the two uplink carriers.

Optionally, the addition request acknowledgement message further includes one or more items of the following information:

the configuration information of the first uplink carrier;
the configuration information of the second uplink carrier; and
the configuration information of the random access preamble.

A center frequency of the first uplink carrier may be 3.5 GHz, and a center frequency of the second uplink carrier may be 1.8 GHz.

The configuration information of the first uplink carrier includes one or more items of the following information:
frequency information of the first uplink carrier;
bandwidth information of the first uplink carrier; and
configuration information of a random access channel resource on the first uplink carrier.

Correspondingly, the configuration information of the second uplink carrier includes one or more items of the following information:
frequency information of the second uplink carrier;
bandwidth information of the second uplink carrier;
configuration information of a random access channel resource on the second uplink carrier; and
7.5 kHz offset information of an uplink resource subcarrier on the second uplink carrier.

In this embodiment of this application, the frequency information may be ARFCN of a carrier, which may be similar to a 16-bit E-UTRA ARFCN (EARFCN) field used in the LTE to indicate an absolute frequency channel number. An EARFCN of an LTE uplink resource may be calculated according to the following formula:

$F_{UL}=F_{UL\_low}+0.1\times(N_{UL}-N_{Offs-UL})$, where $N_{UL}$ is the EARFCN of the LTE uplink resource, $F_{UL}$ is a center frequency of the LTE uplink resource, 0.1 is a grid size 100 kHz of an uplink/downlink resource on an LTE carrier, and $N_{Offs-UL}$ is an EARFCN corresponding to a lowest frequency of a band to which the uplink resource on the LTE carrier belongs. The calculation of the EARFCN is associated with a definition of an NR band and a definition of a grid size of an uplink/downlink resource in the band.

In this embodiment of this application, bandwidth information may indicate bandwidth of a carrier. Specifically, the bandwidth information indicates that an overhead of a required quantity of bits is associated with a quantity of predefined bandwidth sizes supported by an uplink resource/downlink resource. Each predefined bandwidth size is associated with a value of a bit included in one piece of bandwidth information. An association method is similar to that in LTE. For example, bandwidth indication information may indicate, via three bits, that six types of predefined bandwidth are supported: 1.4 MHz, 3 MHz, 5 MHz, 10 MHz, 15 MHz, and 20 MHz. Each type of predefined bandwidth is mapped to one value of 3 bits, for example, 000 represents 1.4 MHz, 001 represents 3 MHz, and another case may be deduced by analogy. Optionally, bandwidth information of an uplink resource may further include subcarrier spacing information used by an uplink carrier. The subcarrier spacing information supports at least 15 kHz, 30 kHz, 60 kHz, 120 kHz, 240 kHz, 480 kHz, and the like. Subcarrier spacings of 7.5 kHz and 3.75 kHz may also be included. Each subcarrier spacing may be represented by one bit value.

Optionally, the configuration information of the random access channel resource includes at least time domain resource information (which slot in a system frame may be used to send a preamble), frequency domain resource information (which frequency domain resource on an uplink carrier may be used to send a preamble), and preamble format information (including at least a preamble sequence length, a subcarrier spacing size, a time domain length, and the like) that are of an RACH.

Optionally, the 7.5 kHz offset information of the uplink resource subcarrier may include at least one of a non-offset configuration mode on the uplink resource subcarrier, a baseband offset 7.5 kHz on the uplink resource subcarrier, a radio frequency offset 7.5 kHz on the uplink resource subcarrier, and a grid offset 7.5 kHz of an uplink resource. A subcarrier spacing of an NR supplementary uplink resource is set to 15 kHz. The baseband offset 7.5 kHz means that an offset of ½ subcarrier is included when a signal is generated. A radio frequency offset 7.5 kHz on an uplink resource means that 7.5 kHz is included when a baseband signal is multiplied by a carrier frequency when the baseband signal is modulated to the intermediate radio frequency. A grid offset 7.5 kHz of an uplink resource means that a frequency corresponding to a frequency channel number 13000 is 1920 MHz+7.5 kHz.

In this embodiment of this application, the configuration information of the random access preamble includes one or more items of the following information:

preamble indication information, used to indicate a dedicated preamble used by the terminal to initiate random access, where the preamble indication information may be a number of the preamble and the terminal may directly determine the preamble based on the number of the preamble; and physical random access channel indication information, used to indicate a random access channel resource used by the terminal to send the preamble.

In step 404, after receiving the addition request acknowledgement message, the second access network device does not parse content included in the addition request acknowledgement message, but directly transparently transmits information included in the addition request acknowledgement message to the terminal via the RRC connection reconfiguration signaling.

Certainly, the second access network device may parse information such as the carrier indication information included in the addition request acknowledgement message. Specifically, whether the second access network device parses the information included in the addition request acknowledgement message may be determined based on an actual situation. Details are not described herein again.

As described above, the addition request acknowledgement message received by the second access network device may further include other content. For details, refer to the foregoing descriptions. Details are not described herein again.

In step 405, the second access network device may send the carrier indication information to the terminal via the RRC connection reconfiguration signaling. The RRC connection reconfiguration signaling may further include information such as the configuration information of the first uplink carrier, the configuration information of the second uplink carrier, and the configuration information of the random access preamble. After the first access network device sends the information to the second access network device, the second access network device transparently transmits the information to the terminal via the RRC connection reconfiguration signaling.

In step 406, when receiving the carrier indication information, the terminal receives, at the same time, information such as the configuration information of the random access preamble. The terminal may determine, based on the configuration information of the random access preamble, a dedicated preamble allocated by the first access network device to the terminal and a random access channel resource on the carrier. Therefore, the terminal may send the preamble to the first access network device on a random access channel resource on the third uplink carrier indicated by the carrier indication information, so as to access the first access network device in a non-contention random access manner.

The foregoing process is described below via specific embodiments.

Figure 5:
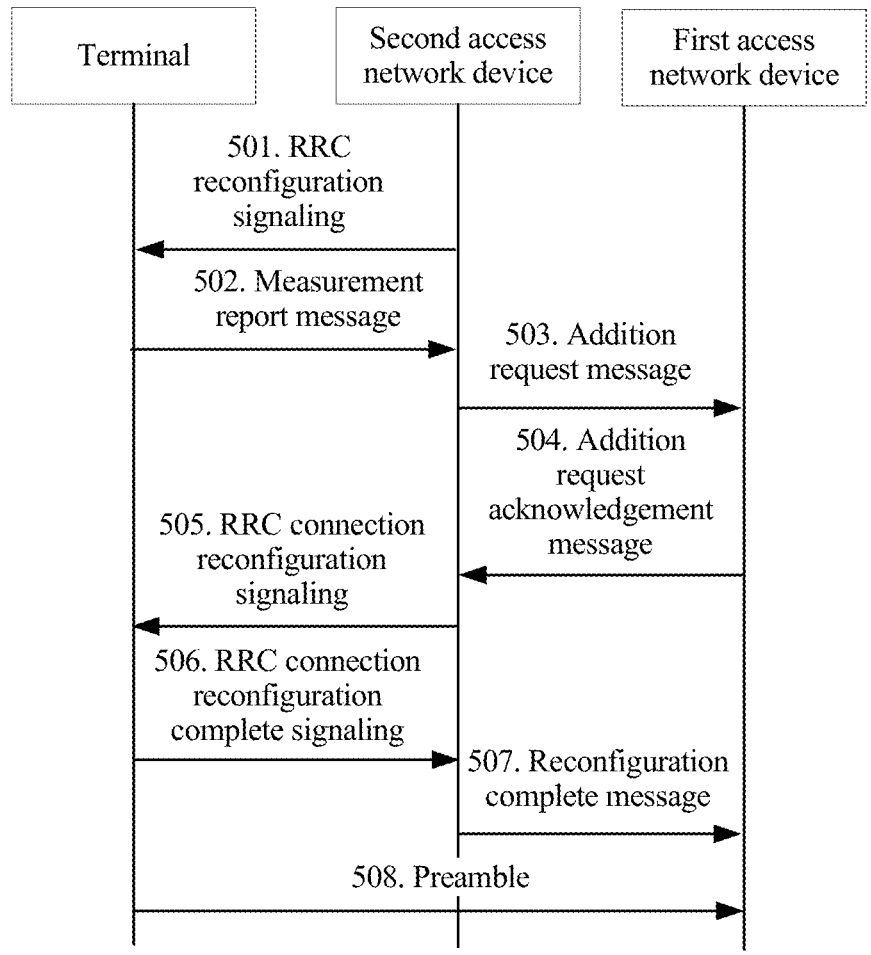
FIG. 5 is a schematic flowchart of a communication method according to an embodiment of this application.

FIG. 5 is a schematic flowchart of a communication method according to an embodiment of this application.

In a process shown in FIG. 5, a first access network device and a second access network device serve a terminal in a dual-connectivity manner. The terminal establishes an RRC connection to the second access network device, but establishes no RRC connection to the first access network device. The first access network device may be a secondary access network device, and the second access network device is a primary access network device.

Step 501: A second access network device sends RRC reconfiguration signaling to a terminal, where the RRC reconfiguration signaling includes information such as frequency channel number information, bandwidth information, and a cell identifier that are of each cell on a first access network device. The RRC reconfiguration signaling is used to instruct the terminal to measure signal quality of a carrier in each cell of the first access network device.

Step 502: The terminal measures signal quality of a carrier in each cell of the first access network device, and returns a measurement result to the second access network device via a measurement report message.

The measurement result returned by the terminal includes but is not limited to a signal measurement value of a downlink carrier in each cell of the first access network device. The signal measurement value may be an RSRP value, a downlink path loss value, or the like.

Step 503: The second access network device determines, as a cell to be accessed by the terminal, a cell having best signal quality of a carrier in cells of the first access network device, and sends an addition request message to the first access network device.

The cell determined by the second access network includes one downlink carrier and two uplink carriers (the two uplink carriers are a first uplink carrier and a second uplink carrier). The first uplink carrier has a correspondence with a downlink carrier in the cell. The second uplink carrier is a supplementary uplink resource for the first uplink carrier. For example, center frequencies of the first uplink carrier and the downlink carrier may be 3.5 GHz, and a center frequency of the second uplink carrier may be 1.8 GHz.

With reference to the foregoing descriptions, the addition request message may include a first signal measurement value, a second signal measurement value, a physical cell identifier of the cell, frequency channel number information of a carrier included in the cell, bandwidth information of a carrier included in the cell, and the like.

Step 504: The first access network device sends an addition request acknowledgement message to the second access network device. The addition request acknowledgement message includes but is not limited to carrier indication information, configuration information of the first uplink carrier, configuration information of the second uplink carrier, and configuration information of a random access preamble.

Step 505: The second access network device sends RRC connection reconfiguration signaling to the terminal, where the RRC connection reconfiguration signaling is used to transparently transmit, to the terminal, information such as carrier indication information, configuration information of a first uplink carrier, configuration information of a second uplink carrier, and configuration information of a random access preamble that are included in the addition request acknowledgement message.

Step 506: The terminal sends RRC reconfiguration complete signaling to the second access network device.

Step 507: The second access network device sends a reconfiguration complete message to the first access network device.

Step 508: The terminal sends a preamble to the first access network device on a random access channel resource on a third uplink carrier indicated by the carrier indication information, so as to access the first access network device in a non-contention random access manner.

Figure 6:
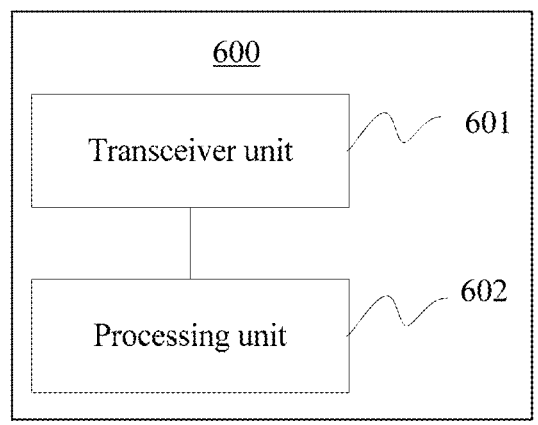
FIG. 6 is a schematic structural diagram of a resource scheduling apparatus according to an embodiment of this application.

FIG. 6 is a schematic structural diagram of a resource scheduling apparatus according to an embodiment of this application. The resource scheduling apparatus may perform actions of the first access network device in the foregoing method embodiments.

The resource scheduling apparatus 600 includes a transceiver unit 601 and a processing unit 602.

The transceiver unit 601 is configured to receive an addition request message from a second access network device. The addition request message includes a first signal measurement value. The first signal measurement value is a signal measurement value of a downlink carrier corresponding to a first uplink carrier.

The processing unit 602 is configured to determine, based on the first signal measurement value, a third uplink carrier used by a terminal to send a preamble to the first access network device.

The transceiver unit 601 is configured to send an addition request acknowledgement message to the second access network device.

The addition request acknowledgement message includes carrier indication information. The carrier indication information is used to indicate the third uplink carrier. The third uplink carrier is at least one of the first uplink carrier and a second uplink carrier. The second uplink carrier and the first uplink carrier belong to a same cell of the first access network device.

In an optional implementation solution, the addition request acknowledgement message further includes one or more items of the following information:

configuration information of the first uplink carrier;
configuration information of the second uplink carrier; and
configuration information of a random access preamble.

In an optional implementation solution, the second uplink carrier is a supplementary uplink resource for the first uplink carrier, and the configuration information of the second uplink carrier includes one or more items of the following information:

frequency channel number information of the second uplink carrier;
bandwidth information of the second uplink carrier;
configuration information of a random access channel resource on the second uplink carrier; and
7.5 kHz offset information of an uplink resource subcarrier on the second uplink carrier.

In an optional implementation solution, the configuration information of the random access preamble includes one or more items of the following information:

preamble indication information, used to indicate a dedicated preamble used by the terminal to initiate random access; and
physical random access channel indication information, used to indicate a random access channel resource used by the terminal to send the preamble.

In an optional implementation solution, the first signal measurement value is a reference signal received power value of the downlink carrier corresponding to the first uplink carrier; or
the first signal measurement value is a downlink path loss value of the downlink carrier corresponding to the first uplink carrier.

In an optional implementation solution, after the transceiver unit 601 sends the addition request acknowledgement message to the second access network device, the transceiver unit 601 is further configured to receive the preamble sent by the terminal via the third uplink carrier.

In an optional implementation solution, the addition request message further includes a second signal measurement value, and the second signal measurement value is a signal measurement value of a downlink carrier corresponding to the second uplink carrier.

The processing unit 602 is specifically configured to:

determine signal quality of the first uplink carrier based on the first signal measurement value, and determine signal quality of the second uplink carrier based on the second signal measurement value; and if it is determined that the signal quality of the first uplink carrier is better than the signal quality of the second uplink carrier, determine the first uplink carrier as the third uplink carrier used by the terminal to send a preamble to the first access network device; or if it is determined that the signal quality of the second uplink carrier is better than the signal quality of the first uplink carrier, determine the second uplink carrier as the third uplink carrier used by the terminal to send a preamble to the first access network device.

Figure 7:
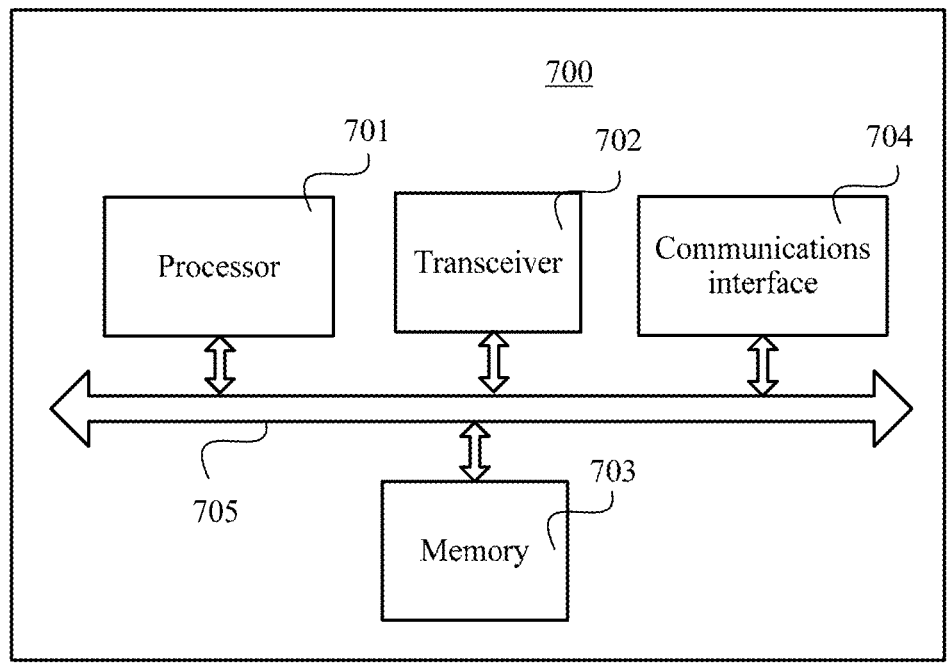
FIG. 7 is a schematic structural diagram of a resource scheduling apparatus according to an embodiment of this application.

FIG. 7 is a schematic structural diagram of a resource scheduling apparatus according to an embodiment of this application. The resource scheduling apparatus may perform actions of the first access network device in the foregoing method embodiments.

Referring to FIG. 7, the apparatus 700 includes a processor 701, a transceiver 702, a memory 703, and a communications interface 704. The processor 701, the transceiver 702, the memory 703, and the communications interface 704 are connected to each other via a bus 705.

The processor 701 may be a central processing unit (CPU), a network processor (NP), or a combination of a CPU and an NP. The processor 701 may further include a hardware chip. The foregoing hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory 703 may include a volatile memory, such as a random-access memory (RAM). Alternatively, the memory 703 may include a non-volatile memory, such as a flash memory, a hard disk drive (HDD), or a solid-state drive (SSD). Alternatively, the memory 703 may include a combination of the foregoing types of memories.

The communications interface 704 may be a wired communications interface, a wireless communications interface, or a combination thereof. The wired communications interface may be, for example, an Ethernet interface. The Ethernet interface may be an optical interface, an electrical interface, or a combination thereof. The wireless communications interface may be a WLAN interface.

The bus 705 may be a peripheral component interconnect (PCI) bus, an extended industry standard architecture (EISA) bus, or the like. The bus may be classified into an address bus, a data bus, a control bus, and the like. For ease of representation, only one double-headed arrow is used to represent the bus in FIG. 7, but this does not mean that there is only one bus or only one type of bus.

The memory 703 may be configured to store a program instruction. By invoking the program instruction stored in the memory 703, the processor 701 may perform one or more steps or an optional implementation in the embodiments shown in the foregoing solutions, so that the resource scheduling apparatus 700 implements a function in the foregoing methods.

The transceiver 702 is configured to receive an addition request message from a second access network device. The addition request message includes a first signal measurement value. The first signal measurement value is a signal measurement value of a downlink carrier corresponding to a first uplink carrier.

The processor 701 is configured to determine, based on the first signal measurement value, a third uplink carrier used by a terminal to send a preamble to the first access network device.

The transceiver 702 is configured to send an addition request acknowledgement message to the second access network device.

The addition request acknowledgement message includes carrier indication information. The carrier indication information is used to indicate the third uplink carrier. The third uplink carrier is at least one of the first uplink carrier and a second uplink carrier. The second uplink carrier and the first uplink carrier belong to a same cell of the first access network device.

In an optional implementation solution, the addition request acknowledgement message further includes one or more items of the following information:
configuration information of the first uplink carrier;
configuration information of the second uplink carrier; and
configuration information of a random access preamble.

In an optional implementation solution, the second uplink carrier is a supplementary uplink resource for the first uplink carrier, and
the configuration information of the second uplink carrier includes one or more items of the following information:
frequency channel number information of the second uplink carrier;
bandwidth information of the second uplink carrier;
configuration information of a random access channel resource on the second uplink carrier; and
7.5 kHz offset information of an uplink resource subcarrier on the second uplink carrier.

In an optional implementation solution, the configuration information of the random access preamble includes one or more items of the following information:
preamble indication information, used to indicate a dedicated preamble used by the terminal to initiate random access; and
physical random access channel indication information, used to indicate a random access channel resource used by the terminal to send the preamble.

In an optional implementation solution, the first signal measurement value is a reference signal received power value of the downlink carrier corresponding to the first uplink carrier; or
the first signal measurement value is a downlink path loss value of the downlink carrier corresponding to the first uplink carrier.

In an optional implementation solution, after the transceiver 702 sends the addition request acknowledgement message to the second access network device, the transceiver 702 is further configured to:
receive the preamble sent by the terminal via the third uplink carrier.

In an optional implementation solution, the addition request message further includes a second signal measurement value, and the second signal measurement value is a signal measurement value of a downlink carrier corresponding to the second uplink carrier.

The processor 701 is specifically configured to:
determine signal quality of the first uplink carrier based on the first signal measurement value, and determine signal quality of the second uplink carrier based on the second signal measurement value; and
if it is determined that the signal quality of the first uplink carrier is better than the signal quality of the second uplink carrier, determine the first uplink carrier as the third uplink carrier used by the terminal to send a preamble to the first access network device; or if it is determined that the signal quality of the second uplink carrier is better than the signal quality of the first uplink carrier, determine the second uplink carrier as the third uplink carrier used by the terminal to send a preamble to the first access network device.

Figure 8:
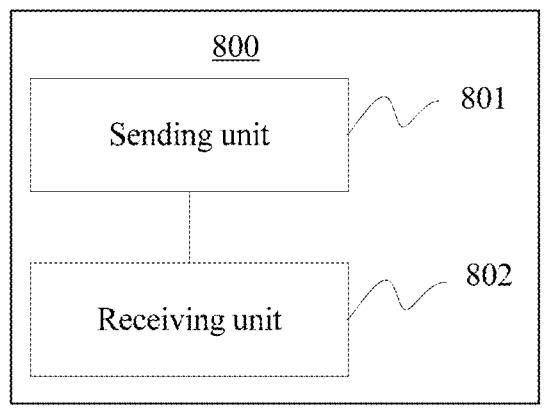
FIG. 8 is a schematic structural diagram of a resource scheduling apparatus according to an embodiment of this application.

FIG. 8 is a schematic structural diagram of a resource scheduling apparatus according to an embodiment of this application. The resource scheduling apparatus may perform actions of the second access network device in the foregoing method embodiments.

The resource scheduling apparatus 800 includes a sending unit 801 and a receiving unit 802.

The sending unit 801 is configured to send an addition request message to a first access network device. The addition request message includes a first signal measurement value. The first signal measurement value is a signal measurement value of a downlink carrier corresponding to a first uplink carrier.

The receiving unit 802 is configured to receive an addition request acknowledgement message from the first access network device. The addition request acknowledgement message includes carrier indication information. The carrier indication information is used to indicate a third uplink carrier used by a terminal to send a preamble to the first access network device. The third uplink carrier is at least one of the first uplink carrier and a second uplink carrier. The second uplink carrier and the first uplink carrier belong to a same cell of the first access network device. The third uplink carrier is determined by the first access network device based on the first signal measurement value.

The sending unit 801 is configured to send the carrier indication information to the terminal.

In an optional implementation solution, the addition request acknowledgement message further includes one or more items of the following information:
configuration information of the first uplink carrier;
configuration information of the second uplink carrier; and
configuration information of a random access preamble.

In an optional implementation solution, the second uplink carrier is a supplementary uplink resource for the first uplink carrier, and
the configuration information of the second uplink carrier includes one or more items of the following information:
frequency channel number information of the second uplink carrier;
bandwidth information of the second uplink carrier;
configuration information of a random access channel resource on the second uplink carrier; and
7.5 kHz offset information of an uplink resource subcarrier on the second uplink carrier.

In an optional implementation solution, the configuration information of the random access preamble includes one or more items of the following information:
preamble indication information, used to indicate a dedicated preamble used by the terminal to initiate random access; and
physical random access channel indication information, used to indicate a random access channel resource used by the terminal to send the preamble.

In an optional implementation solution, the first signal measurement value is a reference signal received power value of the downlink carrier corresponding to the first uplink carrier; or
the first signal measurement value is a downlink path loss value of the downlink carrier corresponding to the first uplink carrier.

In an optional implementation solution, the addition request message further includes a second signal measurement value, and the second signal measurement value is a signal measurement value of a downlink carrier corresponding to the second uplink carrier.

Before the receiving unit sends the addition request message to the first access network device, the receiving unit is further configured to:
receive the first signal measurement value and the second signal measurement value that are reported by the terminal.

Figure 9:
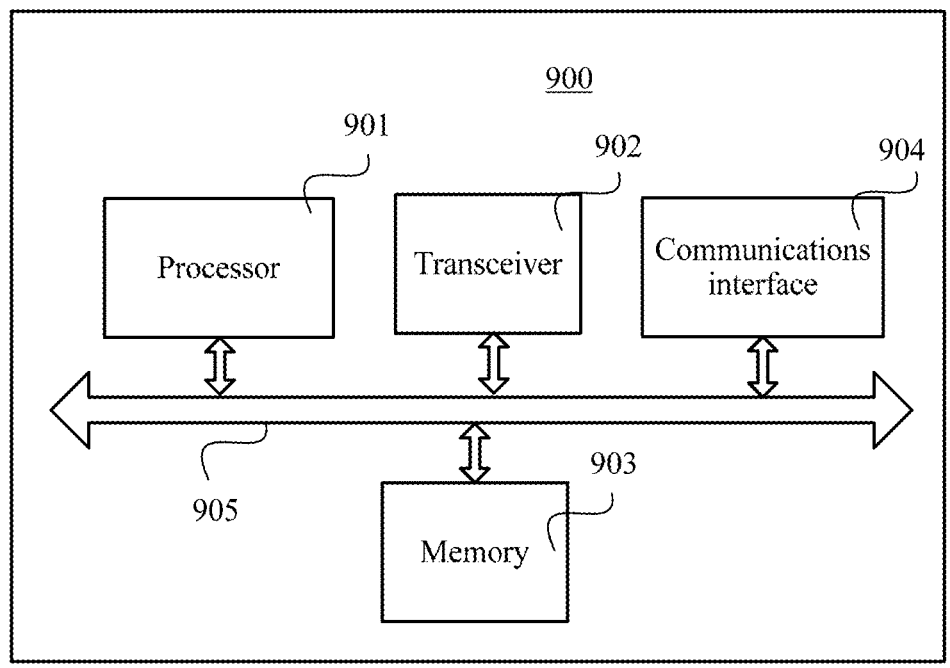
FIG. 9 is a schematic structural diagram of a resource scheduling apparatus according to an embodiment of this application.

FIG. 9 is a schematic structural diagram of a resource scheduling apparatus according to an embodiment of this application. The resource scheduling apparatus may perform actions of the second access network device in the foregoing method embodiments.

Referring to FIG. 9, the apparatus 900 includes a processor 901, a transceiver 902, a memory 903, and a communications interface 904. The processor 901, the transceiver 902, the memory 903, and the communications interface 904 are connected to each other via a bus 905. For specific content of the foregoing modules, refer to descriptions of related modules in FIG. 7. Details are not described herein again.

The processor 901 is configured to send an addition request message to a first access network device via the transceiver 902. The addition request message includes a first signal measurement value. The first signal measurement value is a signal measurement value of a downlink carrier corresponding to a first uplink carrier.

The processor 901 is configured to receive an addition request acknowledgement message from the first access network device via the transceiver 902. The addition request acknowledgement message includes carrier indication information. The carrier indication information is used to indicate a third uplink carrier used by a terminal to send a preamble to the first access network device. The third uplink carrier is at least one of the first uplink carrier and a second uplink carrier. The second uplink carrier and the first uplink carrier belong to a same cell of the first access network device. The third uplink carrier is determined by the first access network device based on the first signal measurement value.

The processor 901 is configured to send the carrier indication information to the terminal via the transceiver 902.

In an optional implementation solution, the addition request acknowledgement message further includes one or more items of the following information:
configuration information of the first uplink carrier;
configuration information of the second uplink carrier; and
configuration information of a random access preamble.

In an optional implementation solution, the second uplink carrier is a supplementary uplink resource for the first uplink carrier, and
the configuration information of the second uplink carrier includes one or more items of the following information:
frequency channel number information of the second uplink carrier;
bandwidth information of the second uplink carrier;
configuration information of a random access channel resource on the second uplink carrier; and
7.5 kHz offset information of an uplink resource subcarrier on the second uplink carrier.

In an optional implementation solution, the configuration information of the random access preamble includes one or more items of the following information:
preamble indication information, used to indicate a dedicated preamble used by the terminal to initiate random access; and physical random access channel indication information, used to indicate a random access channel resource used by the terminal to send the preamble.

In an optional implementation solution, the first signal measurement value is a reference signal received power value of the downlink carrier corresponding to the first uplink carrier; or the first signal measurement value is a downlink path loss value of the downlink carrier corresponding to the first uplink carrier.

In an optional implementation solution, the addition request message further includes a second signal measurement value, and the second signal measurement value is a signal measurement value of a downlink carrier corresponding to the second uplink carrier.

Before the processor 901 sends the addition request message to the first access network device via the transceiver 902, the processor 901 is further configured to:

receive, via the transceiver 902, the first signal measurement value and the second signal measurement value that are reported by the terminal.

Figure 10:
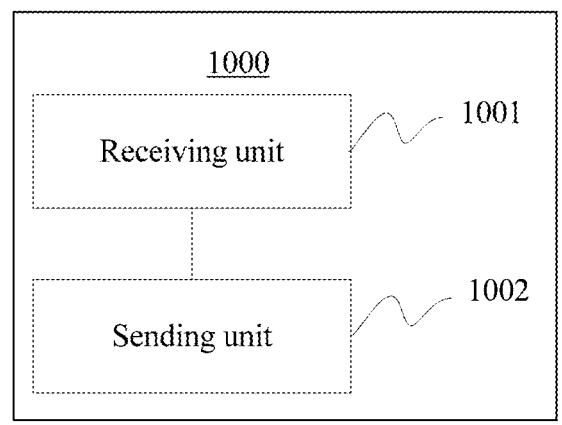
FIG. 10 is a schematic structural diagram of a resource scheduling apparatus according to an embodiment of this application.

FIG. 10 is a schematic structural diagram of a resource scheduling apparatus according to an embodiment of this application. The resource scheduling apparatus may perform actions of the terminal in the foregoing method embodiments.

The resource scheduling apparatus 1000 includes a receiving unit 1001 and a sending unit 1002.

The receiving unit 1001 is configured to receive carrier indication information sent by a second access network device. The second access network device is a device that establishes a radio resource control connection to the terminal. The carrier indication information is used to indicate a third uplink carrier used by the terminal to send a preamble to a first access network device. The third uplink carrier is at least one of the first uplink carrier and a second uplink carrier. The second uplink carrier and the first uplink carrier belong to a same cell of the first access network device. The third uplink carrier is determined by the first access network device based on the first signal measurement value.

The sending unit 1002 is configured to send a preamble to the first access network device via the third uplink carrier.

In an optional implementation solution, before the receiving unit 1001 receives the carrier indication information sent by the second access network device, the sending unit 1002 is further configured to:

send the first signal measurement value and a second signal measurement value to the second access network device. The second signal measurement value is a signal measurement value of a downlink carrier corresponding to the second uplink carrier.

Figure 11:
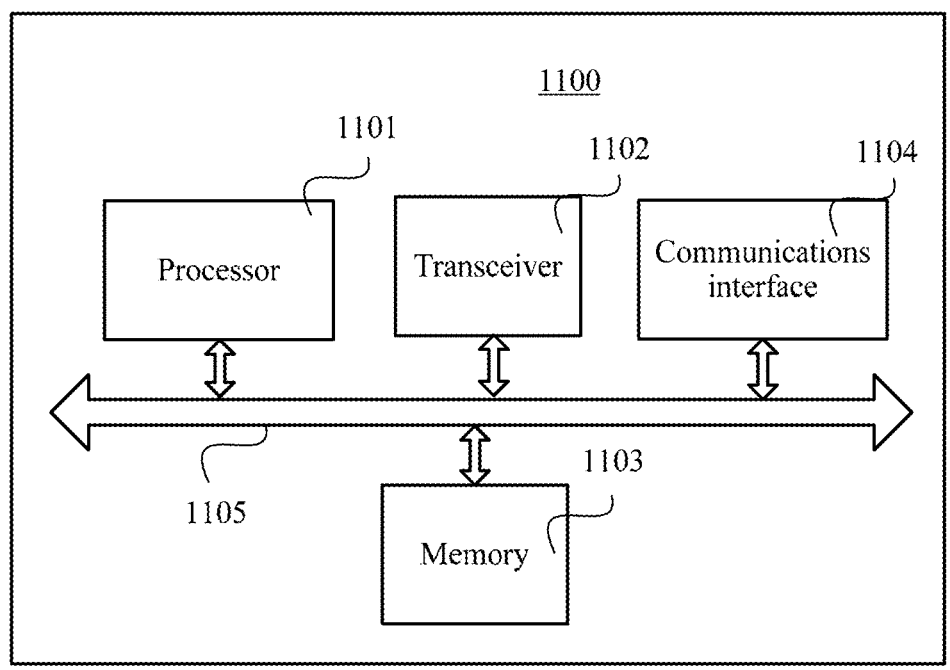
FIG. 11 is a schematic structural diagram of a resource scheduling apparatus according to an embodiment of this application.

FIG. 11 is a schematic structural diagram of a resource scheduling apparatus according to an embodiment of this application. The resource scheduling apparatus may perform actions of the terminal in the foregoing method embodiments.

Referring to FIG. 11, the apparatus 1100 includes a processor 1101, a transceiver 1102, a memory 1103, and a communications interface 1104. The processor 1101, the transceiver 1102, the memory 1103, and the communications interface 1104 are connected to each other via a bus 1105. For specific content of the foregoing modules, refer to descriptions of related modules in FIG. 7. Details are not described herein again.

The processor 1101 receives, via the transceiver 1102, carrier indication information sent by a second access network device. The second access network device is a device that establishes a radio resource control connection to the terminal. The carrier indication information is used to indicate a third uplink carrier used by the terminal to send a preamble to a first access network device. The third uplink carrier is at least one of the first uplink carrier and a second uplink carrier. The second uplink carrier and the first uplink carrier belong to a same cell of the first access network device. The third uplink carrier is determined by the first access network device based on the first signal measurement value.

The processor 1101 is configured to send a preamble to the first access network device via the third uplink carrier and the transceiver 1102.

In an optional implementation solution, before the processor 1101 receives, via the transceiver 1102, the carrier indication information sent by the second access network device, the processor 1101 is further configured to:

send, via the transceiver 1102, the first signal measurement value and a second signal measurement value to the second access network device. The second signal measurement value is a signal measurement value of a downlink carrier corresponding to the second uplink carrier.

An embodiment of this application further provides a computer-readable storage medium, configured to store a computer software instruction that may be executed by the foregoing processor. The computer software instruction includes a program that needs to be executed by the foregoing processor.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method, comprising:
  receiving, by a first access network device from a second access network device, an addition request message for dual-connectivity in which the first access network device and the second access network device serve a terminal; and
  sending, by the first access network device, an addition request acknowledgement message to the second access network device, wherein:
    the addition request acknowledgement message comprises carrier indication information and 7.5 kHz offset information of an uplink resource subcarrier on a second uplink carrier, wherein the 7.5 kHz offset information is relative to a first uplink carrier, and the carrier indication information and the 7.5 kHz offset information are transparently transmitted via radio resource control (RRC) reconfiguration signaling from the second access network device to the terminal,
    the carrier indication information indicates a third uplink carrier for the terminal to send a random access preamble to the first access network device,
    the third uplink carrier is at least one of: the first uplink carrier or the second uplink carrier,
    the second uplink carrier and the first uplink carrier belong to a same cell of the first access network device, and
    the second uplink carrier is a supplementary uplink carrier for the first uplink carrier.

2. The method according to claim 1, wherein the addition request acknowledgement message further comprises one or more items of the following information:
  configuration information of the first uplink carrier;
  configuration information of the second uplink carrier; or
  configuration information of the random access preamble.

3. The method according to claim 2, wherein the configuration information of the random access preamble comprises one or more items of the following information:
  preamble indication information indicating the random access preamble for the terminal; or
  physical random access channel indication information indicating a random access channel resource for the terminal to send the random access preamble.

4. The method according to claim 1, wherein the method further comprises:
  receiving, by the first access network device, the random access preamble sent by the terminal via the third uplink carrier.

5. The method according to claim 1, wherein the addition request message comprises a first signal measurement value, and the first signal measurement value is a signal measurement value of a downlink carrier corresponding to the first uplink carrier.

6. The method according to claim 5, wherein the method further comprises:
  determining, by the first access network device based on the first signal measurement value, the third uplink carrier for the terminal to send the random access preamble.

7. The method according to claim 6, wherein the addition request message further comprises a second signal measurement value, and the second signal measurement value is a signal measurement value of a downlink carrier corresponding to the second uplink carrier;
  wherein the determining, by the first access network device based on the first signal measurement value, the third uplink carrier, comprises:
    determining, by the first access network device, signal quality of the first uplink carrier based on the first signal measurement value;
    determining, by the first access network device, signal quality of the second uplink carrier based on the second signal measurement value; and
    if the first access network device determines that the signal quality of the first uplink carrier is better than the signal quality of the second uplink carrier, determining the first uplink carrier as the third uplink carrier used by the terminal to send a preamble to the first access network device; or
    if the first access network device determines that the signal quality of the second uplink carrier is better than the signal quality of the first uplink carrier, determining the second uplink carrier as the third uplink carrier used by the terminal to send a preamble to the first access network device.

8. A method, comprising:
  receiving, by a terminal from a second access network device, radio resource control (RRC) reconfiguration signaling comprising carrier indication information and 7.5 kHz offset information of an uplink resource subcarrier on a second uplink carrier for dual-connectivity in which a first access network device and the second access network device serve the terminal, wherein the 7.5 kHz offset information is relative to a first uplink carrier, and the carrier indication information and the 7.5 kHz offset information are transparently transmitted from the second access network device to the terminal, wherein:
    the carrier indication information indicates a third uplink carrier for the terminal to send a random access preamble to a first access network device,
    the third uplink carrier is at least one of: the first uplink carrier or the second uplink carrier,
    the second uplink carrier and the first uplink carrier belong to a same cell of the first access network device, and
    the second uplink carrier is a supplementary uplink carrier for the first uplink carrier; and
  sending, by the terminal, the random access preamble to the first access network device via the third uplink carrier.

9. The method according to claim 8, further comprising:
  sending, by the terminal, a first signal measurement value to the second access network device.

10. The method according to claim 8, further comprising:
  receiving, by the terminal from the second access network device, one or more items of the following information:

configuration information of the first uplink carrier;
configuration information of the second uplink carrier; or
configuration information of the random access preamble.

11. The method according to claim 10, wherein the configuration information of the random access preamble comprises one or more items of the following information:
preamble indication information indicating the random access preamble for the terminal; or
physical random access channel indication information indicating a random access channel resource for the terminal to send the random access preamble.

12. An apparatus, comprising:
at least one processor; and
at least one non-volatile memory having instructions;
wherein the instructions are executed by the at least one processor to cause the apparatus to perform a method comprising:
receiving from a second access network, an addition request message for dual-connectivity in which the apparatus and a second access network device serve a terminal; and
sending an addition request acknowledgement message to the second access network device, wherein:
the addition request acknowledgement message comprises carrier indication information and 7.5 kHz offset information of an uplink resource subcarrier on a second uplink carrier, wherein the 7.5 kHz offset information is relative to a first uplink carrier, and the carrier indication information and the 7.5 kHz offset information are transparently transmitted via radio resource control (RRC) reconfiguration signaling from the second access network device to the terminal,
the carrier indication information indicates a third uplink carrier for the terminal to send a random access preamble to the apparatus,
the third uplink carrier is at least one of: the first uplink carrier or the second uplink carrier,
the second uplink carrier and the first uplink carrier belong to a same cell of the apparatus, and
the second uplink carrier is a supplementary uplink carrier for the first uplink carrier.

13. The apparatus according to claim 12, wherein the addition request acknowledgement message further comprises one or more items of the following information:
configuration information of the first uplink carrier;
configuration information of the second uplink carrier; or
configuration information of the random access preamble.

14. The apparatus according to claim 13, wherein the configuration information of the random access preamble comprises one or more items of the following information:
preamble indication information indicating the random access preamble for the terminal; or
physical random access channel indication information indicating a random access channel resource for the terminal to send the random access preamble.

15. The apparatus according to claim 12, wherein the method further comprises:
receiving the random access preamble sent by the terminal via the third uplink carrier.

16. The apparatus according to claim 12, wherein the addition request message comprises a first signal measurement value, and the first signal measurement value is a signal measurement value of a downlink carrier corresponding to the first uplink carrier.

17. The apparatus according to claim 16, wherein the method further comprises:

determining, based on the first signal measurement value, the third uplink carrier for the terminal to send the random access preamble.

18. The apparatus according to claim 17, wherein the addition request message further comprises a second signal measurement value, and the second signal measurement value is a signal measurement value of a downlink carrier corresponding to the second uplink carrier;
wherein the determining, based on the first signal measurement value, the third uplink carrier, comprises:
determining signal quality of the first uplink carrier based on the first signal measurement value; and
determining signal quality of the second uplink carrier based on the second signal measurement value; and
if determining that the signal quality of the first uplink carrier is better than the signal quality of the second uplink carrier, determining the first uplink carrier as the third uplink carrier used by the terminal to send a preamble to the apparatus; or
if determining that the signal quality of the second uplink carrier is better than the signal quality of the first uplink carrier, determining the second uplink carrier as the third uplink carrier used by the terminal to send a preamble to the apparatus.

19. An apparatus, comprising:
at least one processor; and
at least one non-volatile memory having instructions;
wherein the instructions are executed by the at least one processor to cause the apparatus to perform a method comprising:
receiving, from a second access network device, radio resource control (RRC) reconfiguration signaling comprising carrier indication information and 7.5 kHz offset information of an uplink resource subcarrier on a second uplink carrier for dual-connectivity in which a first access network device and the second access network device serve the apparatus, wherein the 7.5 kHz offset information is relative to a first uplink carrier, and the carrier indication information and the 7.5 kHz offset information are transparently transmitted from the second access network to the apparatus, wherein:
the carrier indication information indicates a third uplink carrier for the apparatus to send a random access preamble to a first access network device,
the third uplink carrier is at least one of: the first uplink carrier or the second uplink carrier,
the second uplink carrier and the first uplink carrier belong to a same cell of the first access network device, and
the second uplink carrier is a supplementary uplink carrier for the first uplink carrier; and
sending the random access preamble to the first access network device via the third uplink carrier.

20. The apparatus according to claim 19, wherein the method further comprises:
sending a first signal measurement value to the second access network device.

21. The apparatus according to claim 19, wherein the method further comprises:
receiving from the second access network device, one or more items of the following information:
configuration information of the first uplink carrier;
configuration information of the second uplink carrier; or
configuration information of the random access preamble.

22. The apparatus according to claim 21, wherein the configuration information of the random access preamble comprises one or more items of the following information:
  preamble indication information indicating the random access preamble for the apparatus; or
  physical random access channel indication information indicating a random access channel resource for the apparatus to send the random access preamble.

\* \* \* \* \*